Jan. 24, 1928.  
H. G. MUELLER  
ENGINE GOVERNOR  
Filed May 10, 1924  
1,657,025  
2 Sheets-Sheet 1
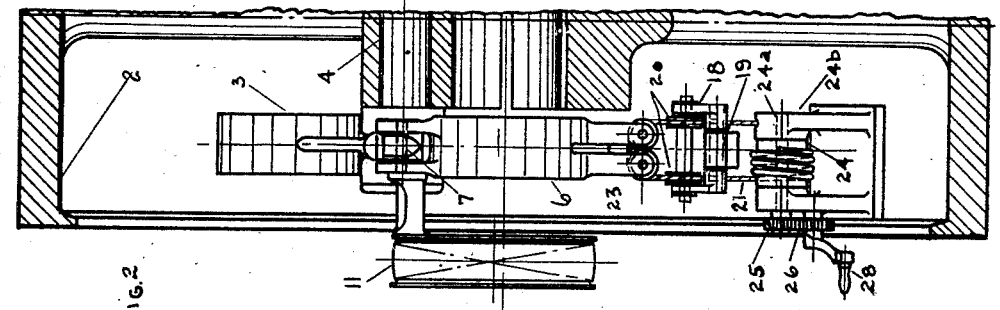
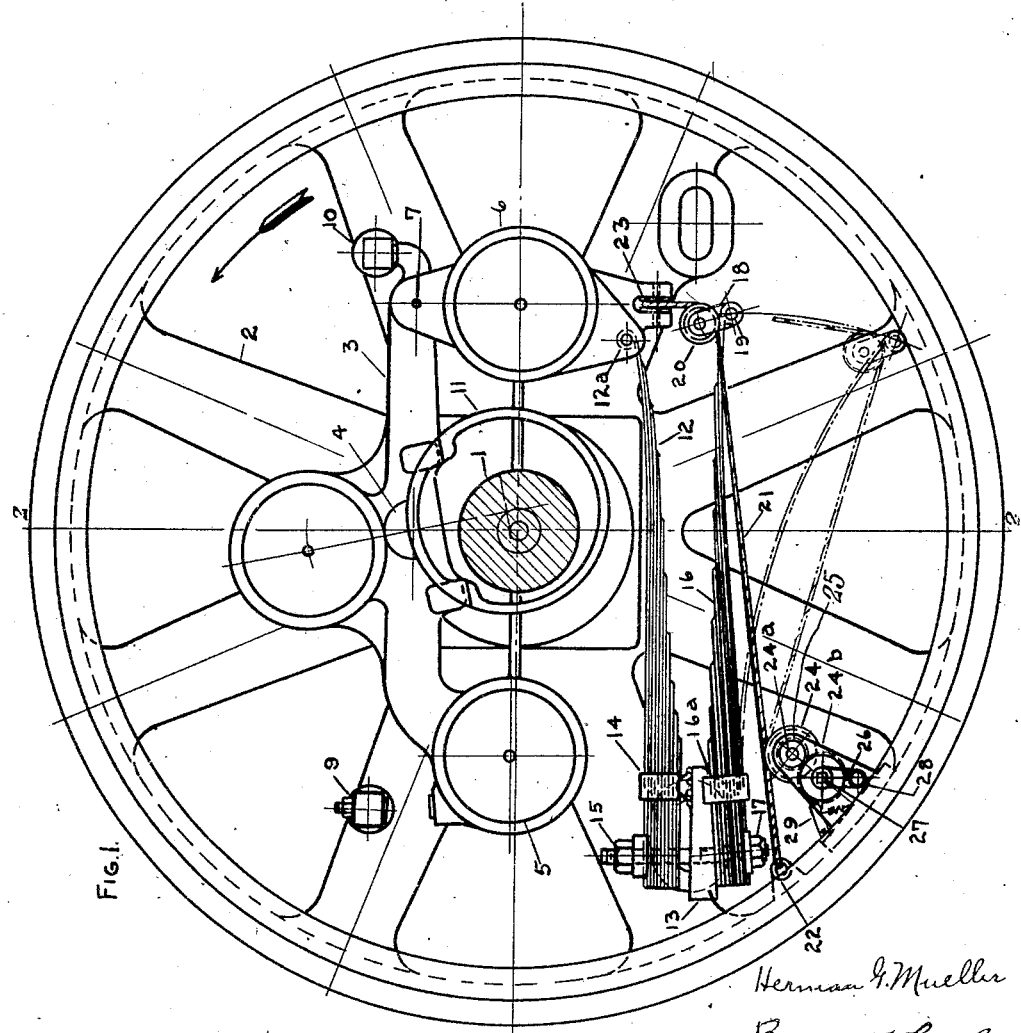

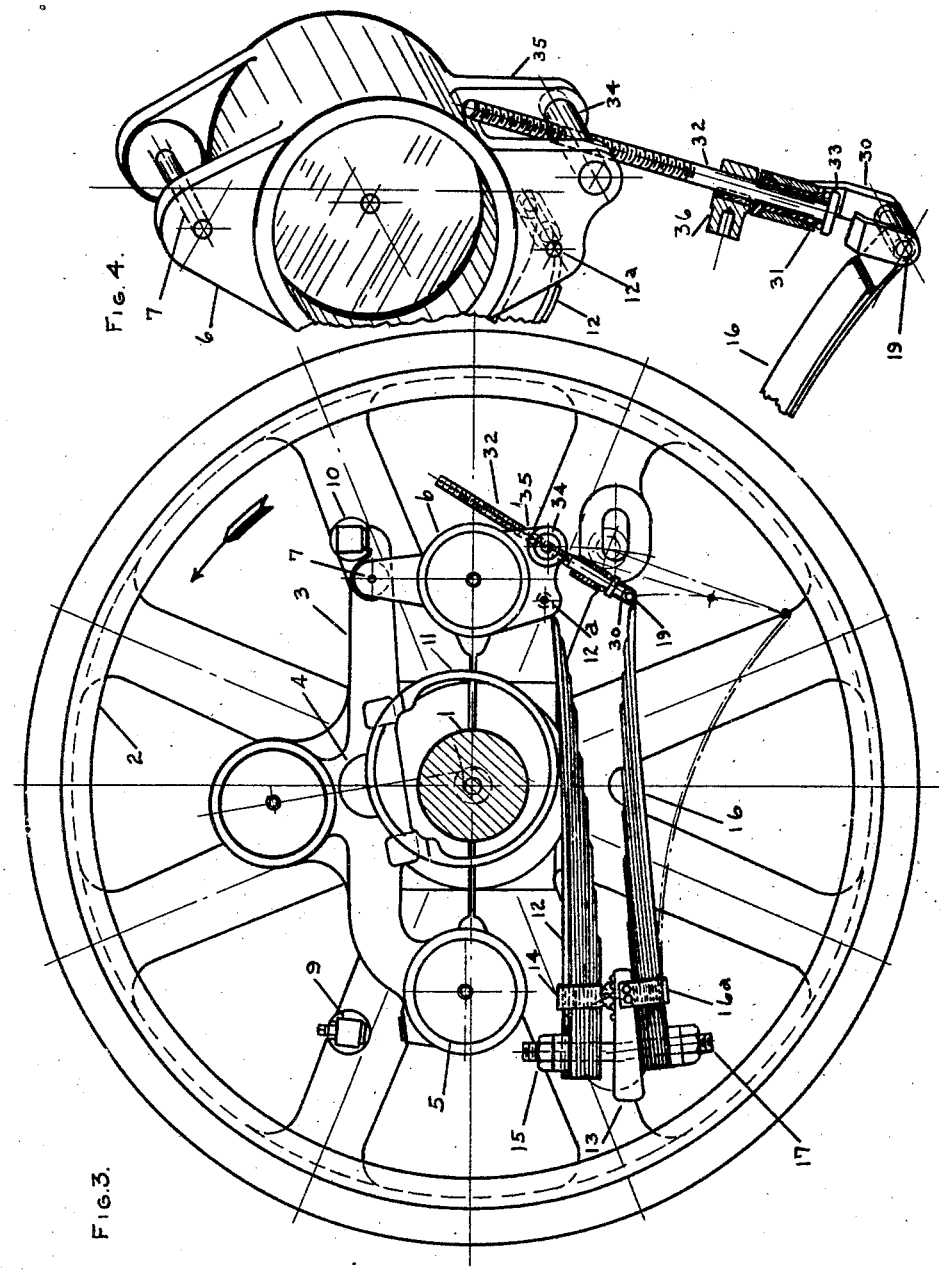

Patented Jan. 24, 1928.

1,657,025

UNITED STATES PATENT OFFICE.

HERMAN G. MUELLER, OF ERIE, PENNSYLVANIA, ASSIGNOR TO SKINNER ENGINE COMPANY, OF ERIE, PENNSYLVANIA, A CORPORATION OF PENNSYLVANIA.

ENGINE GOVERNOR.

Application filed May 10, 1924. Serial No. 712,243.

This invention is designed to vary the speed adjustment of a governor with means maintaining a close regulation at each speed. Features and details of the invention will appear from the specification and claims.

The invention is illustrated in the accompanying drawings as follows:—

Fig. 1 shows a side elevation of a governor.

Fig. 2 a section on the line 2—2 in Fig. 1.

Fig. 3 a side elevation of an alternative construction.

Fig. 4 a perspective view of the adjusting device of the governor.

1 marks the engine shaft, 2 a governor carrier on the shaft, 3 a swinging weight arm, 4 a pin on which the weight arm is mounted, 5 a fixed weight on the weight arm, 6 a swinging weight carried by a pin 7 on the weight arm, 9 a stop for the release position, 10 a maximum stop, 11 an eccentric secured to the weight arm, 12 a leaf spring pivotally connected at 12$^a$ on the swinging weight, 13 a base on which the spring is anchored, 14 a clamp for the spring, and 15 a bolt for securing the spring. These parts are of prior construction.

In carrying out my invention I provide a spring 16. The spring is mounted on the base 13 and secured by a clamp 16$^a$ and bolt 17. A shackle 18 is secured by a pin 19 on the free end of the spring and carries the pulleys 20. A cable 21 is anchored on the carrier 2 at 22, passes around one of the pulleys 20 over pulleys 23 mounted on the swinging weight 6, returned around a second pulley 20 on the shackle 18 and wound on a spool 24. The spool 24 is mounted on a shaft 24$^a$, the shaft being journaled in a bracket 24$^b$. The bracket is mounted on the carrier. A gear 25 is fixed on the shaft 24$^a$ and meshes with a gear 26. The gear 26 is fixed on a shaft 27. A crank 28 is mounted on the shaft 27. A pawl 29 works on the gear 26 to lock the parts in position.

When the cable is fully loosened the counterspring 16 does not exert any influence on the governor, the governor operating entirely under the action of the spring 12. When it is desired to reduce the centripetal element and consequently the normal speed of the governor tension is put on the counterspring 16 by means of the cable 21, this being wound on the spool 24 sufficiently to give the counterspring any tension desired, the tension of the counterspring reducing the effectiveness of the main spring to the extent of the strength of the counterspring at the adjustment made. In this way a very wide range of adjustment may be accomplished and at the same time a close regulation at each speed.

In the alternative construction a shackle 30 is mounted on the free end of the counterspring. A sleeve 31 is carried by the shackle. A screw 32 extends through the sleeve and is provided with a head 33. The screw extends through a trunion 34 carried by arms 35 on the swinging weight. A ratchet lever 36 is mounted on the screw by means of which the screw may be operated to adjust the relation of the free ends of the spring and consequently the effect of the counterspring on the governor.

What I claim as new is:—

1. In an engine governor, the combination of a swinging governor weight; a governor spring resisting the outward movement of said weight; a counterspring directly opposed to the governor spring for resisting the governor spring, said springs having their free ends adjacent and connected; and means for adjusting the effective strength of said springs.

2. In an engine governor, the combination of a swinging governor weight; a governor spring formed of flat leaves resisting the outward movement of said weight; a counterspring formed of flat leaves directly opposed to the governor spring for varying the resistance of said governor spring, said springs having their free ends adjacent and connected; and means for adjusting the effective strength of said springs.

3. In an engine governor, the combination of a swinging governor weight; a governor spring formed of flat leaves resisting the outward movement of said weight; a counterspring formed of flat leaves directly opposed to the governor spring for varying the resistance of said governor spring, said springs having their free ends adjacent and connected; and means for adjusting the effective strength of the counterspring.

4. In an engine governor, the combination of a swinging governor weight; a governor spring formed of flat leaves resisting the outward movement of said weight; a counterspring formed of flat leaves directly opposed to the governor spring for varying the resistance of said governor spring, said springs having their free ends adjacent; and an adjusting means connecting the free ends of said springs.

5. In an engine governor, the combination of a swinging governor weight; a governor spring formed of flat leaves resisting the outward movement of said weight; a counterspring formed of flat leaves directly opposed to the governor spring for varying the resistance of said governor spring; an adjusting means connecting the free ends of said springs comprising a flexible member operating on pulleys between the free ends of said springs; and devices for adjusting and locking the flexible member.

In testimony whereof I have hereunto set my hand.

HERMAN G. MUELLER.